United States Patent [19]

Schmidt et al.

[11] Patent Number: 4,528,729
[45] Date of Patent: Jul. 16, 1985

[54] LOCKING SNAP HOOK

[75] Inventors: Terrance L. Schmidt, Littleton; Wayne L. Olson, Evergreen, both of Colo.

[73] Assignee: Rose Manufacturing Company, Englewood, Colo.

[21] Appl. No.: 527,312

[22] Filed: Aug. 26, 1983

[51] Int. Cl.³ .............................................. A44B 13/00
[52] U.S. Cl. ............................... 24/241 P; 24/241 PP; 24/241 PS; 24/241 SB; 294/82.17; 294/82.2
[58] Field of Search .............. 24/241 R, 241 P, 241 S, 24/241 SB, 241 PP, 241 PS, 231 R; 294/82 R

[56] References Cited

U.S. PATENT DOCUMENTS

| | | | |
|---|---|---|---|
| 620,351 | 2/1899 | McMerrick | 24/241 P |
| 1,071,650 | 8/1913 | O'Kelly | 24/241 SB |
| 1,533,995 | 4/1925 | Lang | 24/241 PS |
| 1,540,923 | 6/1925 | Blair | 24/241 PP |
| 1,626,866 | 5/1927 | Neilson | 24/241 SB |
| 1,849,816 | 3/1932 | Yingling | 24/241 PP |
| 3,827,746 | 8/1974 | Byers | 24/241 PP |

Primary Examiner—Victor N. Sakran
Attorney, Agent, or Firm—Jerry W. Berkstresser; Bruce C. Klaas

[57] ABSTRACT

A locking and latching snap hook, including an open hook body portion which is opened and closed to receive and discharge a to-be-connected item by movement of a normally closed, resiliently biased, latch member pivotally connected to the body. The hook body and latch member each generally carry a portion of one or more locking mechanisms which allows them to be releasably locked together to provide, along with the resilient bias latching, a locking capability to avoid inadvertent disengagement of the latch member from the hook body. The resiliently biased latch member extends beyond the body of the hook on the side opposite to the open hook end, and is capable of being selectively moved in a direction away from the hook end portion about the pivot to open the hook end portion of the body, when the locking mechanism is unlocked, and while simultaneously exerting pivoting force on the resiliently biased normally closed latch member. In some preferred embodiments a locking arrangement is provided by the provision of a locking element within the latch member which interferes with the rotation of the latching gate into an open or disengaged position.

20 Claims, 6 Drawing Figures

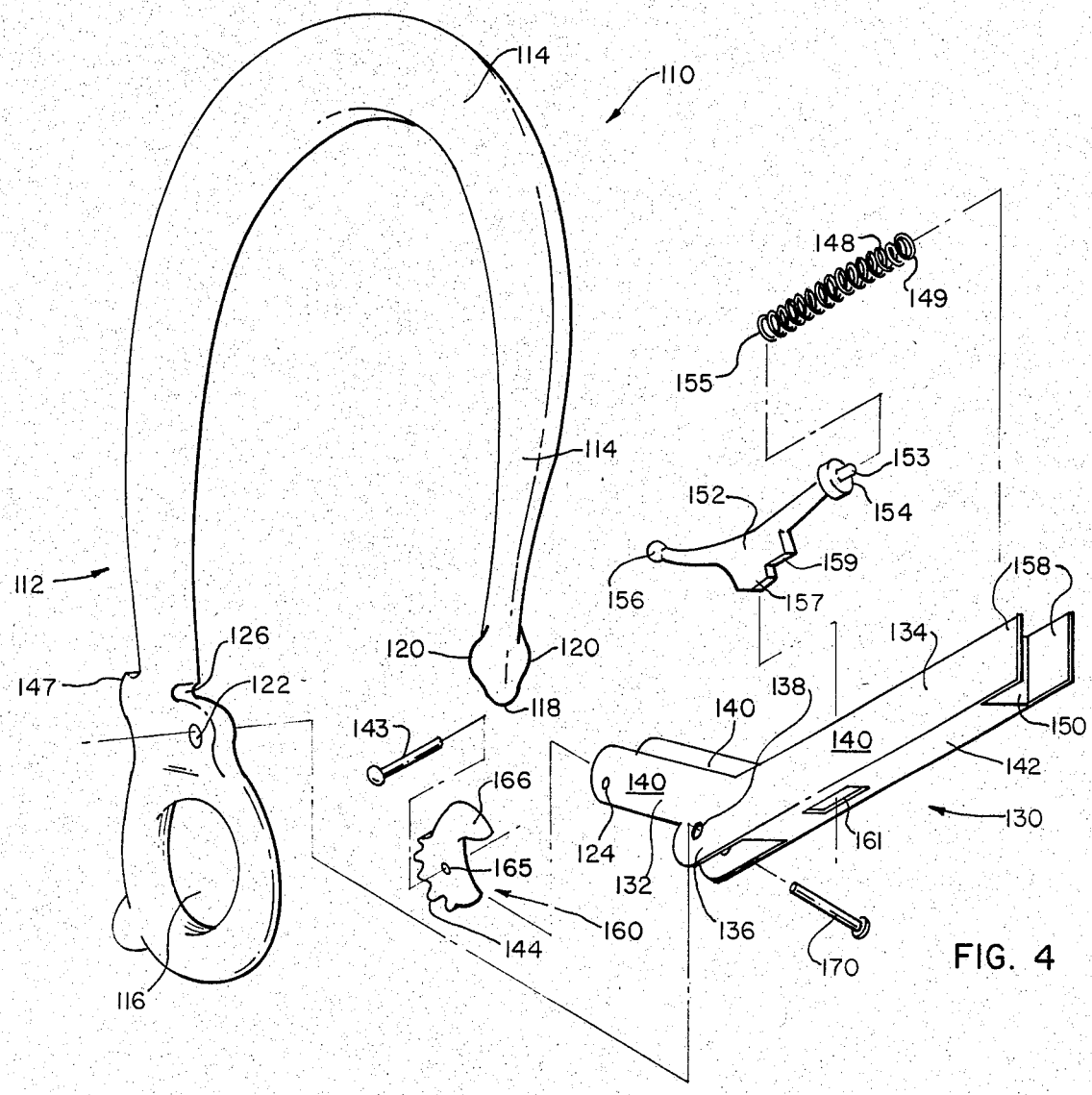
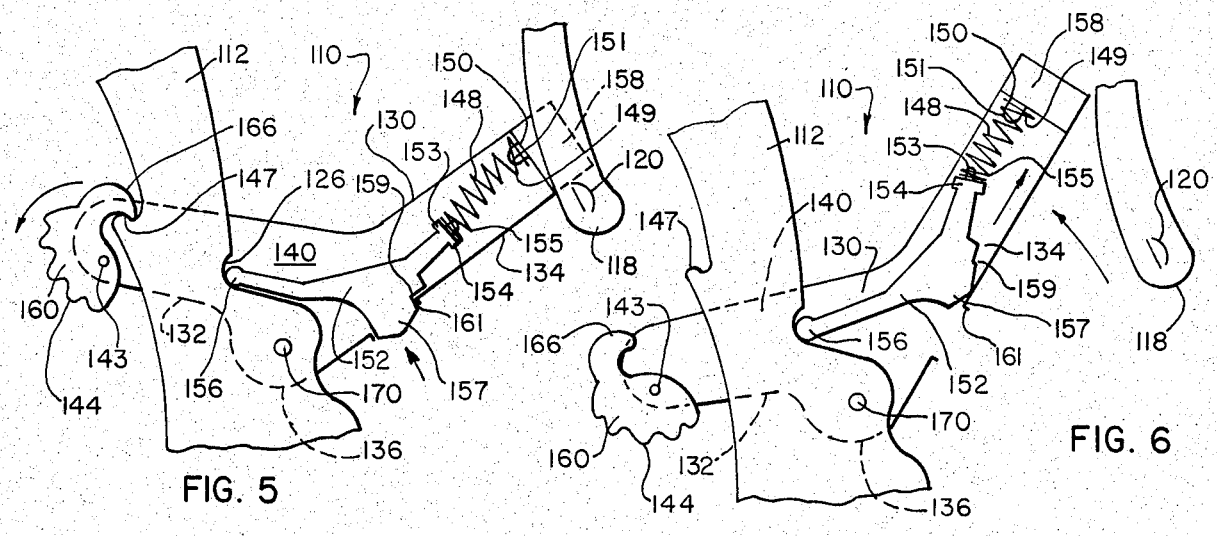
FIG. 4
FIG. 5
FIG. 6

LOCKING SNAP HOOK

BACKGROUND OF THE INVENTION

1. Field of the Invention

The present invention relates to snap hook connectors for use at the ends of rope, cable, chain, or other lines, connectors or fasteners, and more particularly, to spring latched snap hook connectors wherein the latching mechanism can be locked against opening.

2. Discussion of the Prior Art

There are a great variety of available spring biased latching snap hooks for connection to receiving rings, or to lines, or to other fasteners. In many of these uses it is desirable to have a latched snap hook connector which is capable of easy actuation for engagement to and disengagement from a to-be-connected item, while providing a latching and locking function which is configured to resist accidental opening or disengagement. Conventional snap hooks have typically been hook or J-shaped, terminating in a nose, and have had, for example, a latch member or gate that is pivoted about a pin received through the body of the hook, which latch member is normally urged into a position where a portion of the latch member touches or engages the nose of the body by the action of a resilient member, such as a spring, bearing against both the body and the latch member. The size and shape of the nose of the hook body and of the portion of the latch member which engages it are generally preselected to cooperate with each other to resist deformation by lateral forces and to prevent opening of the hook by movement of the latch member beyond its normally closed position by the application of outwardly applied forces. Conditions can be encountered in use where the resiliently biased latch member can be inadvertently actuated by a user into an open position. Where such actuation depresses the biased latch member sufficiently to permit the item to which the snap hook is attached to slip free, the proper function of the snap hook will be defeated.

It is therefore an object of the present invention to provide a snap hook which includes at least one locking mechanism which in addition to the resiliently biased latching function of previous self-latching snap hooks has an additional locking mechanism that locks the latch member in closed, latched relationship with the hook body so as to better resist inadvertent opening of the latching mechanism by the user.

In addition, it is an object of the present invention to provide a resiliently biased latch member on a snap hook which, in concert with an additional locking mechanism provides the desirable feature of one-handed actuation by the user's thumb and/or finger.

These and other objects of the present invention will become apparent to those skilled in the art from the following detailed description showing the novel construction, combination, and arrangement of parts as herein described and more particularly defined by the appended claims, it being understood that such changes in the precise embodiments of the herein disclosed invention are meant to be included and come within the scope of the claims except insofar as precluded by the prior art.

BRIEF DESCRIPTION OF THE DRAWINGS

The accompanying drawings illustrate complete preferred embodiments of the present invention according to the best mode presently devised for the practical application of the present invention.

FIG. 4 is an exploded perspective view of the component parts of a modified form of latching and locking mechanism in accordance with the present invention;

FIG. 5 is a partially broken, partially phantom, side elevational view of the components of the modification of FIG. 4 in a latched and locked position; and FIG. 6 is a partially broken, partially phantom, side elevational view of the components of the modification of FIG. 4 in place, but in an unlocked position.

DETAILED DESCRIPTION OF THE INVENTION

Figure 1:
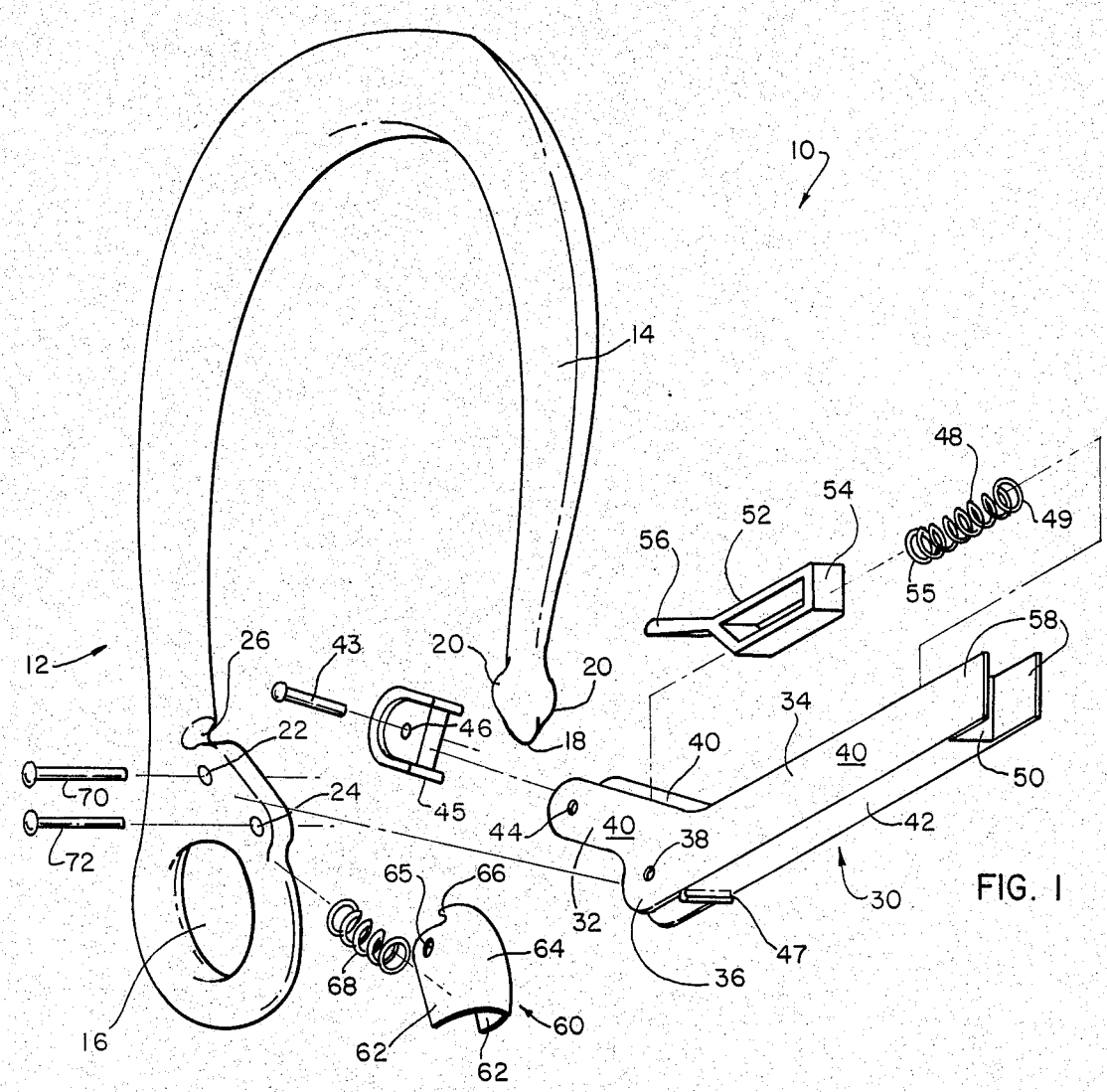
FIG. 1 is an exploded perspective view of the component parts of one latching and locking mechanism of the present invention.
Figures 2, 3:
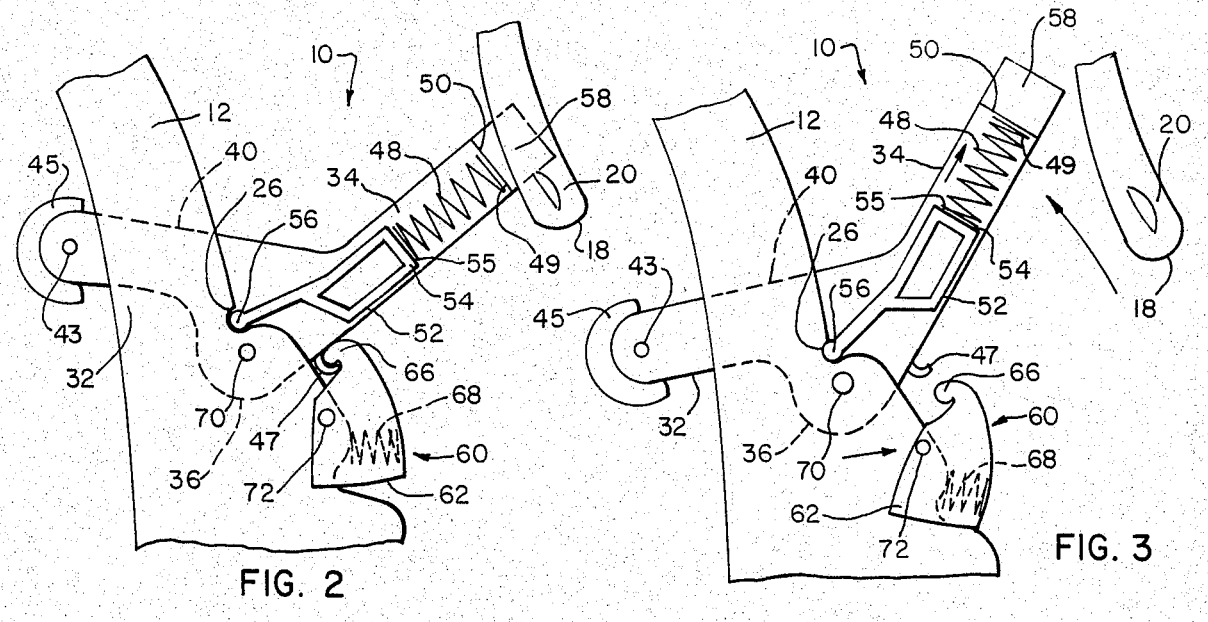
FIG. 2 is a partially broken, partially phantom, side elevational view of the components of FIG. 1 in a latched and locked position.
FIG. 3 is a partially broken, partially phantom, side elevational view of the components of FIG. 1 in an unlatched and unlocked position.

In one preferred embodiment illustrated in FIGS. 1, 2, and 3, a locking and latching snap hook, generally 10, is set forth. The component parts may be most readily understood by reference to the exploded view in FIG. 1, in which it is shown that locking and latching snap hook 10 includes a main body portion 12 in the shape of a hook 14 defining an open substantially V-shaped channel, when not latched. In preferred embodiments one end of body portion 12 defines an opening such as eye 16 for receiving a line, for example, rope, chain or the like, (not shown) having an end fixture for attachment such as a thimble and splice or other suitable fixture, while the hook end of body portion 12 terminates in nose 18. In the embodiment shown, the body portion above and adjacent nose 18 is flattened and expanded to form a pair of stops 20 which extend at right angles to the plane of body portion 12. Body portion 12 also carries and defines holes 22 and 24 for receiving a pair of pins, and a recess 26 for receiving a detent, as detailed below.

Latch member 30 is generally V-shaped in structure, including foot portion 32 and leg portion 34, foot and leg portions 32 and 34 meeting at heel 36 which carries and defines holes 38 (only one shown). Leg and foot portions 34 and 32 are constructed of a pair of spaced apart sidewalls 40 which are coupled by channel wall portion 42. Sidewalls 40, in the vicinity of heel 36, are spaced apart by a slightly greater distance than the width of body portion 12 in the vicinity of hole 22. In the preferred embodiment shown, side walls 40 are also coupled mechanically at the end of leg 32 furthest from heel 36 by means of tie rod or pin 43, which in this instance, through holes 44 of sidewalls 40, also serves to support gripping member 45 through hole 46 thereof. Channel wall portion 42 of latch gate 30 also carries keeper element or shoulder 47 of a lock mechanism, which is an important and novel feature of the present invention, for use with other lock components as detailed below.

A substantial portion of leg 34 of latch member 30 is in the form of a hollow square tube, as shown, joined on two sides by channel walls 42 (only one being shown), which side walls merge with or continue as sidewalls 40 of foot portion 32. Resilient latch spring 48 resides within the tube portion of leg 34, one end 49 of spring 48 being in resilient, urging contact with tube end wall 50. Also residing partially within the tube portion of leg 34 is plunger 52, including force transfer end wall 54, against which second end 55 of spring 48 is normally pressed and secured. Plunger 52 terminates at its other end in detent 56. The far end of leg 34, beyond end wall 50, carries a pair of spaced apart flanges 58, which are an extension of sidewalls 40. Flanges 58 are spaced apart a slightly greater distance than the width of nose 18 above stops 20 of body portion 12.

The final element of the locking and latching snap hook 10 is lock element 60, which with lock keeper element 47 constitutes an important and novel feature of the present invention. Lock element 60 is in the form of an extended, slightly tapered shell constructed of a pair of spaced apart side-walls 62 joined at wall connector portion 64. Sidewalls 62 are spaced apart a slightly greater distance than the width of body portion 12 in the vicinity of hole 24. Each sidewall 62 carries and defines aligned holes 65 (only one shown) for receiving a pin, as detailed below. Each sidewall 62 and connector portion 64 come together to terminate at their tapered end in hook or finger 66 which is a second important element of the lock mechanism. A spring 68 is located between sidewalls 62, resting against and secured to the inner surface of lock element 60 at the end opposed to hook 66.

Now, referring to FIG. 2, the manner in which latch member 30 and lock element 60 are combined with body portion 12 to form locking and latching snap hook 10 is shown, with one sidewall 40 removed. As shown in FIG. 2, sidewalls 40 at heel 36 of latch gate 30 carrying holes 38 are positioned to bracket the lower end of body portion 12 in the vicinity of hole 22 in a manner such that holes 38 are registered and aligned with hole 22 of body portion 12. This is accomplished by inserting body portion 12 between sidewalls 40, and can be easily accomplished before sidewalls 40 are connected by tie rod 43. It can also be accomplished after tie rod 43 is connected to sidewalls 42, by orienting and threading body portion 12, starting at nose 18, through sidewalls 40 of foot 32. After the desired alignment between latch member 30 and body portion 12 is completed, pivot pin 70 is inserted through one latch hole 38, then through body hole 22, and finally through second latch hole 38, and secured to pivotally secure latch gate 30 to body portion 12 in the configuration shown in FIG. 2. When so secured and positioned, the far end of leg 32, including gripping member 45 extends beyond body portion 12, while flanges 58 at the far end of of leg 34 bracket the portion of nose end 18 above stops 20, said flanges 58 being supported against rotation outside of hook body 12 by stops 20 of nose 18. Once latch member 30 is in this position, spring 48 will resiliently urge plunger 52 laterally through the tube portion of leg 34 so that detent portion 56 of plunger 52 is in turn resiliently urged into and against recess 26. As a result, latch member 30 is resiliently urged into the stable, spring-biased, latched (closed) position shown in FIG. 2.

Lock element 60 is then secured to the structure by sliding its open sidewalls 62 over body member 12 in the vicinity of hole 24. When holes 64 of lock element 60 are registered and aligned with hole 24 of body portion 12, then pivot pin 72 is inserted through one lock hole 65, through body hole 24, and finally through second lock hole 65 and secured to pivotally secure lock element 60 to body portion 12 in the configuration shown in FIG. 2, with hook 66 of lock element 60 grasping keeper element 47. When in this position, spring 68 will ride against the adjacent portion of body 12, causing lock hook 66 to be urged around pivot pin 72 into positive and continuous locking engagement with element 47 of latch member 30.

In the configuration keeper of FIG. 2, locking and latching snap hook 10 is latched and locked, and will resist accidental opening. For example, downward pressure on the end of leg 32 will not release the locked lock keeper element 47-lock hook 66 configuration, nor will inward pressure on leg 34, and thus latch member 30 cannot be opened except under extreme force causing deformation or fracture. Outward pressure on leg 34 will not allow its flanges 58 to ride past stops 20. Side loading on leg 34 is also resisted by flanges 58. The only manner in which latch member 30 can be opened, as shown in FIG. 3 with one sidewall 40 removed, is by pressing the spring loaded end of lock element 60 towards body member 12 to compress spring 68, causing hook 66 to rotate around pivot 72 and away from keeper element 46, while simultaneously rotating leg 32 down and leg 34 up around pivot 70. The arrangement shown, can be easily so unlocked with one hand, for example, by depressing lock element 60 with the thumb while rotating leg 32 down with the forefinger engaging gripping member 45. Alternatively, lock element 60 could be depressed with a finger and gripping member 45 could be actuated with a thumb. Constructed as shown, snap hook 10 is not likely to be accidentally opened, since two separate and sequential actions are required to unlock and unlatch the snap hook.

In the modified version shown in FIGS. 4, 5 and 6, another, related, but in this case a double locking and latching snap hook, generally 110, is shown. In this embodiment there is also a main body portion 112 in the shape of a hook 114 in which body portion 112 also defines an opening 116 for receiving a connecting element, not shown. Hook 114 terminates in nose 118, one portion of which is flattened to form stops 120. Body portion 112 carries and defines hole 122 for receiving a pivot pin, and recess 126, for receiving a detent, as detailed below. Body portion 112 also carries integral therewith, keeper or finger element 146, which is one element of a lock, as detailed below.

Latch member 130 is in the form of a V-shaped structure or boot, including foot portion 132 and leg portion 134 joined at and forming heel portion 136 which carries and defines hole 138. Both foot 132 and leg 134 are constructed of a pair of spaced apart sidewalls 140, which are coupled by channel wall portion 142 along substantially the entire lower side of foot 134. Rectangular opening 161 is carried and defined by channel wall 142. Sidewalls 140 at heel 136 are spaced apart by a distance slightly wider than body member 112 in the vicinity of hole 122. In this embodiment, side walls 140 of foot 132 carry and define holes 124 which are joined at their end furthest form heel 136 by tie rod or pivot 143, which also serves to support combined gripping-lock element 160, as detailed below.

Resilient latch spring 148 resides within the channel formed by sidewalls 140 and channel wall 142 in leg 134, one end 149 of spring 148 being in resilient urging contact with channel end wall 150 at knob 151. Also residing partially within the channel of leg 134 is locking plunger 152, including force transfer end 154, having retaining knob 153 against which second end 155 of spring 148 is resiliently pressed and secured, plunger 152 terminating at its other end in detent 156. As shown, plunger 152 is bowed and carries trigger 157 including keyed step 159. The far end of leg 134, beyond end wall 150, continues sidewalls 140 to provide flanges 158, flanges 158 being spaced apart a slightly greater distance than the width of nose 118 above stops 120.

An important element of snap hook 110 is lock element 160. Lock element 160 is in the form of an extended, shell terminating at its extended end in hook or finger 166. Hole 65 is carried by lock element 160. A gripping surface 144 is also provided on lock element 160.

Now, referring to FIG. 4, the manner in which latch member 130 and lock element 160 are combined with body portion 112 to form the locking and latching snap hook 110, shown with one sidewall 140 removed. Sidewalls 140 at heel 136 of latch member 130 are positioned to bracket the lower end of body portion 112 in the vicinity of hole 122 in a manner such that holes 138 are registered and aligned with hole 122 of body portion 110. After the desired alignment is completed, pivot pin 170 is inserted through one latch hole 138, through body hole 122, and finally through second latch hole 138, to pivotally secure latch gate 130 to body portion 112 in the configuration and orientation shown in FIG. 5. When so secured the far end of foot 132 extends beyond body portion 112 and flanges 158 of leg 134 bracket nose end 118 above stops 120. Due to the fit provided, leg 134 cannot ride below nose 118. Once latch member 130 is in this position, spring 148 will urge plunger 152 laterally through the channel portion of leg 134 so that detent 156 is urged into and against recess 126 and step portion 159 of plunger 152 is in turn urged into abutting contact with an edge of opening 161, with trigger 157 extending through opening 161. Note that the resulting alignment between detent 156 and step 159 against the edge of opening 161 results in an interfering fit such that neither plunger 152, nor latch member 130 can rotate inwards. As a result, latch member 130 is resiliently urged into a stable closed and locked position, by plunger 152 and the action of step 159 against opening 161, as shown in FIG. 5. Further explanation of the co-action of a plunger with a latch member wall to provide a locking function is found in a U.S. patent application of Wayne L. Olson and Terrance L. Schmidt filed of even date herewith and entitled LOCKING SNAP which is a continuation-in-part of U.S. patent application Ser. No. 433,873 filed Oct. 13, 1982, which is hereby incorporated by reference for all that it contains.

Gripping lock element 160 is secured to the structure by sliding it between sidewalls 140 of leg 132 in the vicinity of hole 124, until hole 165 of lock element 160 is registered and aligned with holes 124 of foot 132. Then pivot pin 143 is inserted through lock hole 165, and through both foot holes 124 and secured, to pivotally secure lock element 160 to foot 132 in the configuration shown in FIG. 5, with hook 166 of lock element 160 grasping keeper element 147 of body element 112 in a stable locking engagement.

In this configuration, latch snap hook 110 is locked and latched, and will resist accidental opening. Downward or upward pressure on the end of foot 132 will not release it from the locking arrangement provided by the interfering engagement of plunger step 159 against the edge of opening 161. Inward pressure on leg 134 will not release foot 132 from the keeper 146-lock hook 166 locking arrangement, nor from the step 159-opening 161, locking arrangement. Downward pressure on leg 134 will not allow it to ride down past stops 120 of nose 118, nor release foot 132 from the lock 147-lock element 160 arrangement. Side loads on the latch member are resisted by flanges 158. The only manner in which latch member 130 can be opened, as shown in FIG. 6 with one sidewall 140 removed, is by pressing the lower end of lock element 160 towards body member 112 to cause hook 166 to rotate around pivot 143 and away from keeper element 146, while simultaneously rotating foot 132 down or leg 134 up around pivot 170, and further, while simultaneously depressing trigger 157 to release step 159 from opening 161. The arrangement shown, can be easily so unlocked with one hand, for example, by depressing lock element 160 with the thumb, and then rotating foot 132 down with the same thumb, while simultaneously depressing trigger 157 with the forefinger. Constructed as shown, the snap hook 110 is not likely to be accidentally opened by a user since multiple and separate actions are required to unlock and unlatch the snap hook.

The locking and latching snap hooks of the present invention can be used in circumstances where it is desirable to have a latch secured against unwanted disengagement. In addition, the particular structures shown can be used alone or in combination to provide additional locking functions if desired. Other locking mechanisms may also be employed with the present invention such as those described in Wayne L. Olson and Terrance L. Schmidt, Ser. No. 433,873, filed Oct. 13, 1982, entitled A Locking Snap, and a continuation-in-part application thereof filed on even date herewith entitled Locking Snap Hook. Further, the devices of the present invention, as described, can be constructed so that the portions of the locking mechanisms, whether locked or unlocked, are in close proximity to the body of the snap hook. It also allows for the locking and other elements to be sized within modest manufacturing tolerance requirements so as to provide a structure which is both easy and economical to manufacture. In addition, the extension of the portions of the latch gate 30, 130 beyond the outer dimensions of the snap hook body 12, 112 (as shown) can be sized and shaped, or modified, for engagement or disengagement in nearly any manner which will be comfortable and convenient for the user when grasping the snap hook. The devices described are therefore capable of being manufactured in a wide variety of sizes for particular uses or applications which favor the use of a snap hook using the teaching of the structures described. Additionally, the structures shown are capable of performing the described function in particular applications by the selection of a wide variety of materials whose physical properties are structurally and functionally suitable for fulfilling the particular design requirements of use.

It must also be understood that the preferred embodiments set forth, hereinabove, may be easily modified while leaving the resulting mechanism within the scope of the present invention. For example, a locking member such as lock element 60 or 160 might be mounted on the hook body and an associated keeper such as keeper 47 or 146 might be mounted on the latch gate to perform the same locking functions as described above. Location of the locking mechanisms as, for example, to the nose area of the body and to the related latch member portion is also within the scope of the invention, as is the use of interfering mechanisms, other than that shown, to achieve the desired locking function. Similarly, location of the locking mechanism within the loop area formed by the hook body and latch member, at either intersection of the hook body and latch member, is within the scope of the invention. The use of more than two locking mechanisms is also contemplated. Different locking mechanisms may also be used and still remain within the scope of the invention. Likewise, the specific form of any part of the structure may be changed. For example, the coil springs shown may be substituted with a wide variety of other spring or resilient structures with whatever attendant changes that would be required without departing from the spirit of the invention as described herein.

The invention has been particularly shown and described with reference to preferred embodiments thereof to describe all of the contemplated features which it can contain. However, it will be appreciated and understood by those skilled in the art that the foregoing and other modifications or changes in form and details, including the deletion or addition of certain features, may be made therein without departing from the spirit, scope and function of the invention as described and claimed, except as precluded by the prior art as it restricts the appended claims.

What is claimed is:

1. Locking and latching snap hook apparatus comprising in combination:
    a hook body member having an open hook shaped end;
    a latch member pivotally connected to said hook member and intersecting or contacting said hook member at the pivotal connection and at a portion of said open hook opposed to said pivotal connection;
    means within said latch member for resiliently biasing and locking said latch member into a first normally latched position wherein said open hook shaped end of said hook body is closed by said latch member, while allowing said latch member to be pivoted against said biasing means to at least one second position in which said open hook shaped end of said hook body is open; and
    first locking means for releasably locking said members into said first normally latched position, said first locking means including a first locking element carried by said hook body member, and a second locking element carried by said latch member, said first and second locking elements being located to cooperate in releasable interlocking engagement to secure and lock said latch member in its first normal position, wherein it closes said open hook end of said hook body.

2. The invention of claim 1 wherein said first locking element is a finger and said second locking element is a shoulder.

3. The invention of claim 2 wherein said finger is carried by a separate locking member moveably connected to said hook body member.

4. The invention of claim 3 wherein said separate locking member is pivotally connected to said hook body member.

5. The invention of claim 4 wherein said locking finger is carried by said hook body member at a location juxtaposed to one of the contacts or intersections of said latch member with said hook body member.

6. The invention of claim 5 wherein said locking finger is located outside of an enclosure defined by said hook body member and said latch member in said normally latched position and proximate said area of pivotal attachment of said latch member to said hook body.

7. The invention of claim 1 wherein said latch member extends beyond said pivotal connection and outside of said body member, and wherein said latch member first locking element comprises a shoulder and wherein said second locking element comprises a locking finger located to interlock with said shoulder.

8. The invention of claim 5 wherein said separate locking member is finger or thumb actuatable.

9. The invention of claim 2 wherein said first locking element is carried by said latch member, and said second locking element is carried by said hook body member.

10. The invention of claim 1 wherein a second locking means is provided to cooperate with said first locking means to releasably double lock said latch member in its first normal position.

11. The invention of claim 10 wherein said second locking means includes a third locking element carried by said hook body member and a fourth locking element carried by said latch member.

12. The invention of claim 11 wherein said third locking element is a plunger and said fourth locking element is an edge surface of an opening in said latch body which is engageable with a shoulder portion of said plunger.

13. The invention of claim 12 wherein said plunger resides substantially within said latch member.

14. The invention of claim 13 wherein a portion of said plunger is in pivotal contact with said hook body member.

15. The invention of claim 2 wherein said locking member is actuable to be opened with either hand.

16. The invention of claim 10 wherein said locking member is actuable to be opened with either hand.

17. The invention of claim 1, 2, 3, 4, 5, 6, 7, 8 or 9 further comprising:
    means for normally bringing said first locking element into locking engagement with said second locking element when said latch member is in its first normally latched position, and means for causing disengagement of said first locking element and said second locking element, whereby said latch member can be moved from its first normally latched and locked position to its second open position.

18. The invention of claims 10, 11, 12, 13, 14, 15, or 16 further comprising:
    means for normally bringing said first locking element into locking engagement with said second locking element when said latch member is in its first normally latched position, and means for causing disengagement of said first locking element and said second locking element, whereby said latch member can be moved from its first normally latched and locked position to its second open position; and
    means for normally bringing said third locking element into locking engagement with said fourth locking element when said latch member is in its third normally latched position, and means for causing disengagement of said third locking element and said fourth locking element, whereby said latch member can be moved from its first normally latched and locked position to its second open position.

19. Locking and latching snap hook apparatus comprising in combination:
- a hook body member having an open hook shaped end;
- a latch member pivotally connected to said hook member and intersecting or contacting said hook member at the pivotal connection and at a portion of said open hook opposed to said pivotal connection;
- means for resiliently biasing said latch member into a first normally latched position wherein said open hook shaped end of said hook body is closed by said latch member, while allowing said latch member to be pivoted against said biasing means to at least one second position in which said open hook shaped end of said hook body is open; and
- first locking means for releasably locking said latch member into said first normally latched position, said first locking means including a first locking element pivotally connected to said hook body member, and a second locking element integral with said latch member, said first and second locking elements each being located and shaped so as to be capable of cooperating to provide releasable interlocking engagement to secure and lock said latch member in its first normal position, whereby said latch member closes said open hook end of said hook body.

20. The invention of claim 19 wherein said first locking element is carried by said hook body member at a location juxtaposed to one of the contacts or intersections of said latch member with said hook body member.

* * * * *